United States Patent
Renga et al.

(10) Patent No.: US 9,184,642 B2
(45) Date of Patent: Nov. 10, 2015

(54) SYSTEM FOR HARVESTING ENERGY INCLUDING A COUNTERWEIGHT AND A SYSTEM FOR CONTROLLING THE ANGULAR POSITION OF THE COUNTERWEIGHT

(71) Applicant: Aktiebolaget SKF, Göteborg (SE)

(72) Inventors: Flavio Renga, Turin (IT); Mario Rossi, Rivoli (IT)

(73) Assignee: AKTIEBOLAGET SKF, Gothenburg (SE)

( * ) Notice: Subject to any disclaimer, the term of this patent is extended or adjusted under 35 U.S.C. 154(b) by 43 days.

(21) Appl. No.: 14/093,720

(22) Filed: Dec. 2, 2013

(65) Prior Publication Data

US 2014/0152025 A1      Jun. 5, 2014

(30) Foreign Application Priority Data

Nov. 30, 2012   (IT) ................ TO2012A1035

(51) Int. Cl.
*F02B 63/04*      (2006.01)
*F03G 7/08*       (2006.01)
(Continued)

(52) U.S. Cl.
CPC .............. *H02K 7/1846* (2013.01); *H02P 9/008* (2013.01); *H02P 9/105* (2013.01)

(58) Field of Classification Search
CPC ....... B60K 6/48; H02K 3/28; H02K 11/0073; H02K 16/00; H02K 7/1807; H02K 1/12; H02K 1/2786; H02K 21/12; H02K 23/60; H02K 7/025; F02N 11/087; H02P 29/0016; Y10S 903/906; Y10S 903/903; F02B 63/04; F02B 63/042; F03G 3/00; F03G 3/06; F03G 3/08; H02J 7/02; H02J 7/022
USPC .......... 185/27, 29, 33, 32; 290/1 R, 39, 49, 5, 290/15, 20, 23, 29
See application file for complete search history.

(56) References Cited

U.S. PATENT DOCUMENTS 2,693,573 A * 11/1954 Perkins ................... 323/341
4,024,443 A *  5/1977 Schmucker et al. ......... 318/721
(Continued)

FOREIGN PATENT DOCUMENTS

WO    WO 2006114655 A2 * 11/2006
WO       2009034321 A1    3/2009

OTHER PUBLICATIONS

Tzern T Toh, et al; "A Continuously Rotating Energy Harvester With Maximum Power Point Tracking," Journal of Micromechanics & Microengineering, Institute of Physics, Oct. 1, 2008; 104008, 18, 10, Bristol, GB.
(Continued)

*Primary Examiner* — Tulsidas C Patel
*Assistant Examiner* — Charles Reid, Jr.
(74) *Attorney, Agent, or Firm* — Bryan Peckjian; SKF USA Inc. Patent Dept.

(57) ABSTRACT

A system for harvesting energy including: an electrical machine including a first and a second structure, movable with respect to each other; a counterweight coupled to the second structure; a power transfer structure, electrically connected between the first structure and the load; an angular position sensor which provides a position signal ($\vec{\epsilon}$(t)) indicating the angular position of the counterweight; and an accelerometer which provides an acceleration signal ($\vec{a}$(t)) indicating an acceleration which affects the first structure. The system for harvesting energy further comprising a control unit, which includes: a first stage which generates a limit position signal ($\vec{\epsilon}_{lim}$(t)) indicating an angular instability region (R-I); and a second stage which controls the power transfer structure based on the position signal and on the limit position signal, so as to modulate the transfer of electrical power to the load so as to prevent the counterweight from entering into the angular instability region.

10 Claims, 7 Drawing Sheets

(51) Int. Cl.
*H02K 7/18* (2006.01)
*H02K 23/60* (2006.01)
*H02P 9/04* (2006.01)
*F03G 3/00* (2006.01)
*H02P 9/10* (2006.01)
*H02P 9/00* (2006.01)

(56) References Cited

U.S. PATENT DOCUMENTS

| | | | | |
|---|---|---|---|---|
| 4,054,835 A | * | 10/1977 | Los et al. | 324/109 |
| 4,229,728 A | * | 10/1980 | Tremba | 340/447 |
| 4,539,496 A | * | 9/1985 | Thomas et al. | 310/68 B |
| 4,761,577 A | * | 8/1988 | Thomas et al. | 310/67 A |
| 6,089,511 A | * | 7/2000 | Rasmusson | 244/171.1 |
| 6,345,789 B1 | * | 2/2002 | Rasmusson | 244/171.5 |
| 6,570,265 B1 | * | 5/2003 | Shiraishi et al. | 290/40 C |
| 6,742,386 B1 | * | 6/2004 | Larson | 73/146.4 |
| 7,327,113 B2 | * | 2/2008 | Steigerwald et al. | 318/599 |
| 8,766,465 B2 | * | 7/2014 | Powers | 290/1 R |
| 2001/0032746 A1 | * | 10/2001 | Foster, Sr. | 180/300 |
| 2005/0152489 A1 | * | 7/2005 | Morita et al. | 377/6 |
| 2005/0206351 A1 | * | 9/2005 | Wingett et al. | 322/44 |
| 2006/0065469 A1 | * | 3/2006 | Stefano et al. | 180/333 |
| 2007/0137943 A1 | * | 6/2007 | Duclos | 185/27 |
| 2007/0138793 A1 | * | 6/2007 | Zimmerman et al. | 290/1 R |
| 2009/0160191 A1 | * | 6/2009 | Beane | 290/53 |
| 2009/0189393 A1 | * | 7/2009 | Tyagi et al. | 290/44 |
| 2010/0123314 A1 | * | 5/2010 | Menke | 290/44 |
| 2010/0262308 A1 | * | 10/2010 | Anderson et al. | 700/287 |
| 2014/0152217 A1 | * | 6/2014 | Hiry et al. | 318/400.21 |

OTHER PUBLICATIONS

Tzern Tzuin Toh; "A Gravitational Torque Energy Harvesting System for Rotational Motion;" Feb. 1, 2011.

Tzern T Toh, et al; "Continuously Rotating Energy Harvester With Improved Power Density," Proceedings Power MEMS 2008, Sendai, Japan, pp. 221-224.

* cited by examiner

SYSTEM FOR HARVESTING ENERGY INCLUDING A COUNTERWEIGHT AND A SYSTEM FOR CONTROLLING THE ANGULAR POSITION OF THE COUNTERWEIGHT

CROSS-REFERENCE TO RELATED APPLICATIONS

This application claims priority to Italian Patent Application No. TO2012A001035 filed Nov. 30, 2012, the contents of which are herein fully incorporated by reference.

FIELD OF THE INVENTION

The present invention relates to a system for harvesting energy including a counterweight and a system for controlling the angular position of the counterweight.

BACKGROUND OF THE INVENTION

As known, systems for harvesting energy which allow to convert mechanical energy into electrical energy and to store the electrical energy thus obtained are available today.

For example, the article by T. T. Toh et al., "Continuously rotating energy harvester with improved power density", Power MEMS 2008 Proceedings, pages 221-224, Sendai (JP), describes a system for harvesting energy of the continuously rotating type, which comprises a rotor, a stator and a counterweight, which is constrained to the stator. The rotor and the stator are part of a dynamo, thus the rotor is integral with a rotating element, which is actuated, for example, by an external motor.

In use, the external motor keeps the rotating element rotating. In turn, the rotor rotates together with the rotating element, while the counterweight tends to keep the stator fixed by applying a corresponding torque, which is caused by the force of gravity. A relative motion of the rotor with respect to the stator occurs, with consequent generation of electricity in the dynamo. Such an electrical power is transferred to a load, such as a battery, for example.

More in particular, the electrical power transfer causes the passage of current in the rotor, which in turn causes the application of a driving torque on the stator. The stator assumes a position during the rotation of the rotor which is distanced by an angular distance $\theta$, measured along the direction of rotation, from the position that the stator itself would assume if the rotor were not rotating, which is also referred to as the 'rest position'. Because the angular distance $\theta$ is not zero, the gravitational torque acting on the stator balances the driving torque so that the stator tends to remain immobile.

In greater detail, the power transfer occurs only if the rotation speed of the rotating element does not exceed a critical angular speed, beyond which the gravitational torque can no longer contrast the driving torque and the stator starts rotating together with the rotor. In practice, the gravitational torque assumes a maximum value when the angular distance $\theta$ of the counterweight from the rest position is equal to 90°; driving torques higher than such maximum value imply angular distances $\theta$ greater than 90°, which correspond to progressively lower gravitational torque values. Thus, when the angular distance $\theta$ of the counterweight exceeds a critical distance $\theta_c$ equal to 90°, the system for harvesting energy enters into a condition of instability, in which the counterweight tends to rotate at the same angular speed as the rotor, and the power transfer is essentially zero, due to the cancellation of the relative motion between stator and rotor.

In order to optimize the electrical power transfer, a so-called maximum power point tracking (MPPT) circuit is present between the dynamo and the load.

The MPPT circuit adapts the input impedance of the load to the output impedance of the dynamo, in order to maximize power transfer. In practice, the MPPT circuit adapts the impedance of the load to the impedance of the rotor armature.

In greater detail, the MPPT circuit comprises a so-called switching circuit, which is controlled by using a pulse-width-modulated (PWM) signal, generated by the MPPT circuit itself. The impedance is adapted by varying the duty cycle of such a pulse-width-modulated signal.

In even greater detail, the switching circuit has an electrical input, which is connected to the terminals of the rotor armature. An input current and an input voltage, delivered by the dynamo, are thus present on the electrical input of the circuit. The MPPT varies the duty cycle of the pulse-width-modulated signal as a function of the input current and the input voltage, correspondingly modulating the transfer of electrical power from the dynamo to the load.

The MPPT circuit thus allows to maximize the transfer of energy to the load, however its operation implies that the system for harvesting energy may become unstable. Indeed, as previously mentioned, the application of a load to the dynamo implies a braking action, which is greater the higher the current circulating in the rotor armature. Therefore, when attempting to transfer the maximum electrical power available at the dynamo terminals, the MPPT circuit may cause a braking action capable of making the counterweight rotate by an angle greater than the critical distance $\theta_c$. In such a case, the system for harvesting energy becomes unstable. In order to prevent such an occurrence, the rotating element must be rotated at a speed considerably lower than the critical angular speed, and it is necessary to prevent the rotating element from being affected by linear accelerations, i.e. from translating, because such linear accelerations can contribute to reaching instability conditions. In other words, constraints must be introduced into the use of the system for harvesting energy.

It is the object of the present invention to provide a system for harvesting energy which at least partially solves the drawbacks of the prior art.

SUMMARY OF THE INVENTION

According to the present invention, a system for harvesting energy is provided as follows: A system for harvesting energy provides an electrical machine (6) including first and second structures (8, 10), movable with respect to each other, each of the first and second structures alternately forming the rotor or the stator of the electrical machine, the first structure being configured to be constrained to a rotating or rotating and translating element (2), so as to be driven in rotation by the rotating or rotating and translating element; a counterweight (12) coupled to the second structure so that the second structure is subject to a first gravitational torque; a power transfer structure (18, 22), electrically connected to the first structure, configured to be connected to a load (20) and adapted to transfer electrical power from the first structure to the load, in an electrically controllable manner.

The electrical power transfer causes the application of a second torque on the second structure, the module of which is a function of the electrical power transferred, the second torque being balanced, when the counterweight is in an angular stability region, by the first torque so as to cause the generation of an electrical voltage ($V_g$) in the first structure;

an angular position sensor (32) constrained to the first structure and configured to provide a position signal ($\vec{\epsilon}(t)$) indicating the angular position of the counterweight, the angular position being referred to a local reference system (u, w) fixed to the first structure; and an accelerometer (30) constrained to the first structure and configured to provide an acceleration signal ($\vec{a}(t)$) indicating an acceleration which affects the first structure, the acceleration being referred to the local reference system; a control unit (24), having: a first stage (58) configured to generate, based on the acceleration signal, a limit position signal ($\vec{\epsilon}_{lim}(t)$) indicating an angular instability region (R-I), the angular instability region being referred to the local reference system and being such that, when the counterweight is within the angular instability region, the counterweight tends to rotate synchronously with the first structure; and a second stage (66) configured to control the power transfer structure based on the position signal and on the limit position signal, so as to modulate the transfer of electrical power to the load so as to prevent the counterweight from entering into the angular instability region.

BRIEF DESCRIPTION OF THE DRAWINGS

For a better understanding of the invention, embodiments thereof will be described hereafter only by way of non-limitative example, and with reference to the accompanying drawings, in which.

DETAILED DESCRIPTION OF THE INVENTION

Figure 1:
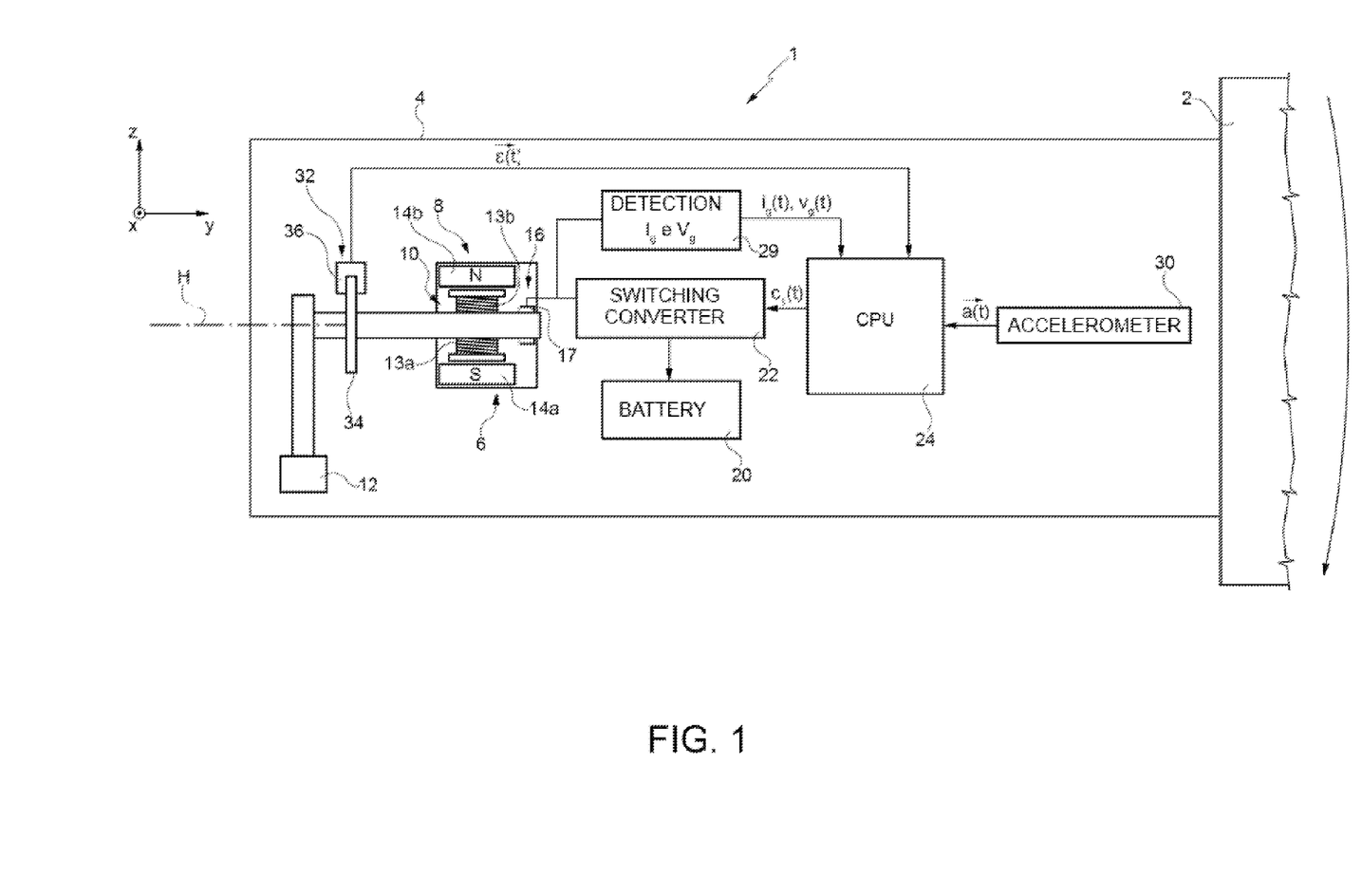
FIG. 1 is a block diagram of an embodiment of the present system for harvesting energy.

FIG. 1 shows a system for harvesting energy 1, which is coupled to a rotating and translating element. By way of example only, the present invention refers to the case in which the rotating and translating element is formed by a train axle, indicated by reference numeral 2 and adapted to rotate about a rotation axis H. In all cases, the present system for harvesting energy 1 may also be used in other than the railway field, by coupling with rotating and translating elements of different type, such as automotive axles, for example. Furthermore, the system for harvesting energy may be coupled to a rotating element instead of a rotating and translating element. With this regard, and again by way of example only, the present system for harvesting energy may be coupled to a rotating element of a so-called conveyor belt.

The system for harvesting energy 1 comprises a container 4, which is fixed to the axle 2, so as to be driven in rotation by the latter. Furthermore, the system for harvesting energy 1 comprises a dynamo 6, of an intrinsically known type, including a stator 8 and a rotor 10. The stator 8 is fixed to the container 4, and thus rotates together with the axle 2, about the rotation axis H. In an intrinsically known manner, the rotor 10 is coupled to the stator 8 by interposition, for example, of ball bearings or bronze bearings (not shown).

The system for harvesting energy 1 further comprises a counterweight 12, which is fixed to the rotor 10, and the centre of gravity of which is distanced by a radial distance from the rotation axis H which is not zero.

In practice, the counterweight 12 tends to keep the rotor 10 fixed with respect to the stator 8, i.e. to prevent the rotor 10 from rotating with the stator 8. Therefore, given an inertia reference system xyz having axis y parallel to the rotation axis H and axis x parallel to the translation direction of the axle 2, for example, the stator 8 rotates about a direction parallel to axis y, while the counterweight 12 moves so that the rotor 10 assumes a fixed position with respect to the stator 8. By way of example only, the inertial reference system xyz is the reference system of the railway line on which the axle 2 rotary-translates.

In greater detail, the rotor 10 comprises a first and a second windings 13a, 13b, while the stator 8 comprises a first and a second magnetic poles 14a, 14b, opposite to each other. Furthermore, the stator 8 comprises an electrical stator circuit 16, which in turn includes brushes 17 adapted to come into contact with sliding contacts (not shown) arranged on the rotor 10 and electrically connected to the first and second windings 13a, 13b. In use, an essentially direct voltage $V_g$ is present at the electrical stator circuit 16 when a relative rotary motion occurs between the stator 8 and the rotor 10.

The system for harvesting energy 1 further comprises a battery 20 (referred to as a load in the claims), a first power transfer stage 22 (referred to as a switching converter in the figures) and a control unit 24 (referred to as a CPU in the figures). In particular, the first power transfer stage 22 is connected to the output of the stator electrical circuit 16; further, both the battery 20 and the control unit 24 are connected to the first power transfer stage 22.

Figure 2:
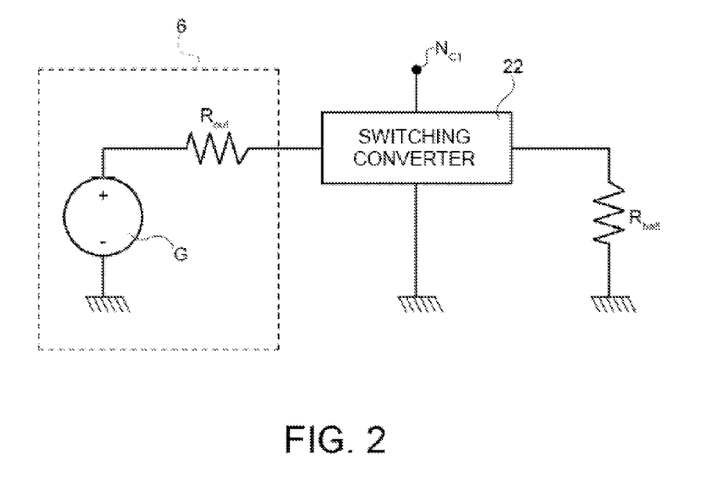
FIG. 2 shows an electrical circuit equivalent to the system for harvesting energy shown in FIG. 1.

The battery 20 is connected to the electrical stator circuit 16 by interposing the first power transfer stage 22. Reference may thus be made to the equivalent electrical diagram shown in FIG. 2, in which the dynamo 6 is modeled as a voltage generator G having an output resistance $R_{out}$, while the battery 20 is modeled as a load resistance $R_{batt}$.

The first power transfer stage 22, described in greater detail below, has first and second input terminals, which are connected to the output terminal of the stator electric circuit 16 and to ground, respectively, and an output terminal, which is connected to the input terminal of the battery 20. Furthermore, the first power transfer stage 22 has a control terminal $N_{c1}$, which is connected to the control unit 24 (connection not shown). By way of example only, hereinafter in the present description it is assumed that in the embodiment shown in FIGS. 1 and 2 the first power transfer stage 22 is formed by a known type switching converter, such as, for example, a so-called buck-boost converter of the non-inverting type, the switching from the "on" to the "off" state of which is controlled by applying a first control signal $c_1(t)$ generated by the control unit 24 (and described below) to the control terminal $N_{c1}$.

The system for harvesting energy 1 further comprises a detector stage 29, connected to the stator electrical circuit 16 and adapted to supply a current signal $i_g(t)$ and a voltage signal $v_g(t)$, indicating a current $I_g$ and the voltage $V_g$ present on the stator electrical circuit 16, respectively. The control unit 24 is also connected to the detector stage 29, so as to receive the current signal $i_g(t)$ and the voltage signal $v_g(t)$.

The system for harvesting energy 1 further comprises an accelerometer 30 of the biaxial type, and an optical encoder 32, which are connected to the control unit 24.

Figure 3:
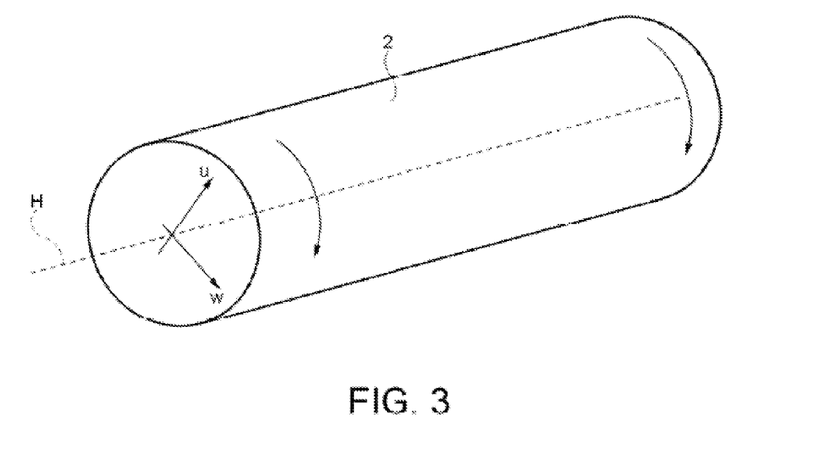
FIG. 3 schematically shows a perspective view of a railway axle and a reference system integral therewith.

The accelerometer 30 is fixed to the container 4 and arranged along the rotation axis H. More in particular, given a local reference system uw (FIG. 3), fixed to the axle 2 and formed by an axis u and an axis w which are reciprocally orthogonal and lay on a plane perpendicular to the rotation axis H, and assuming that the accelerometer 30 is arranged in the origin of such a reference system, the accelerometer 30 detects accelerations parallel either to axis w or to axis u. The accelerometer thus generates (in intrinsically known manner) an acceleration signal $\vec{a}(t)$ of electrical type indicating the acceleration components parallel to axis w and to axis u. The acceleration signal $\vec{a}(t)$ thus indicates a measured acceleration $\vec{a}$, which is a vector quantity.

An optical encoder 32 (of an intrinsically known type and referred to as an angular position sensor in the claims) comprises a moveable element 34, fixed to the rotor 10, and an optical detector 36, fixed to the stator 8 and comprising, for example, an optical source and a photodiode (not shown). The optical encoder 32 works as angular position sensor (in an intrinsically known manner). Therefore, the optical detector 36 generates a position signal $\vec{\epsilon}(t)$, which is of the electrical type indicating the angular position of the rotor 10, and thus of the counterweight 12, with respect to the stator 8. The position signal $\vec{\epsilon}(t)$ thus indicates a measured position $\vec{\epsilon}$, which is a vector quantity and defines, instant by instant, the angular position of the counterweight 12 with respect to the origin of the local reference system uw, and thus with respect to the axle 2. By way of example only, it is further assumed that the measured position $\vec{\epsilon}$ has a unitary module.

Figure 4A:
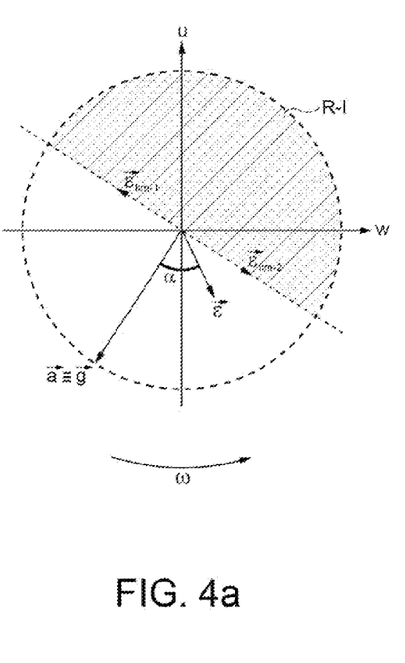
FIGS. 4a-4c and 6 shows the reciprocal arrangements of different vector quantities, within the reference system shown in FIG. 3, and corresponding instability regions.
Figure 4B:
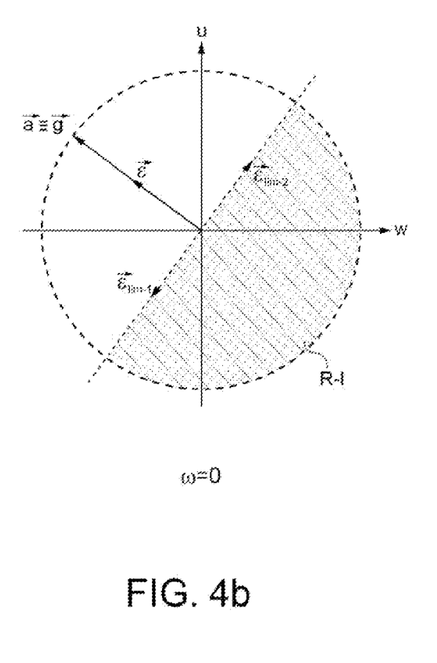
Figure 4C:
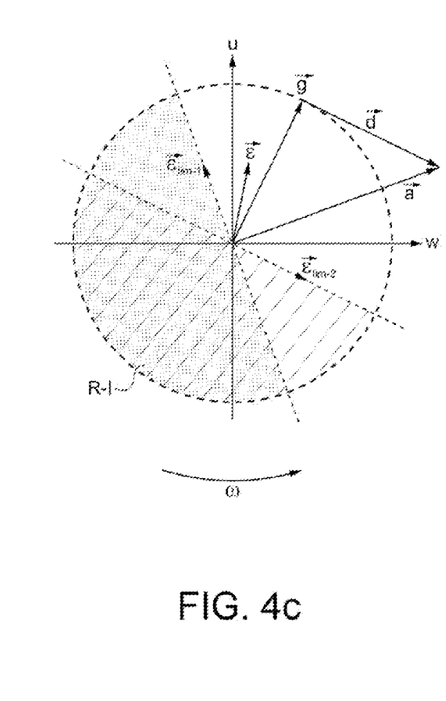

In greater detail, the features of the measured acceleration $\vec{a}$ and of the measured position $\vec{\epsilon}$, and thus indirectly of the acceleration signal $\vec{a}(t)$ and of the position signal $\vec{\epsilon}$, are described in detail, with reference to FIGS. 4a-4c.

In detail, FIG. 4a refers to an instant in an interval of time in which the stator 8 rotates at a constant angular speed ω. In such conditions, the measured acceleration $\vec{a}$ coincides with the gravity acceleration $\vec{g}$ and rotates about the origin of the local reference system uw at an angular speed equal to the angular speed ω of the axle 2. The measured position $\vec{\epsilon}$ also rotates about the local reference system uw at an angular speed equal to the angular speed ω; furthermore, the measured position $\vec{\epsilon}$ is offset by an offset angle α with respect to the measured acceleration $\vec{a}$.

FIG. 4b refers to an instant in an interval of time in which the stator 8 is stationary. In this case, the measured acceleration $\vec{a}$ coincides with the gravity acceleration $\vec{g}$ and is fixed with respect to the origin of the local reference system uw. The measured position $\vec{\epsilon}$ is fixed with respect to the local reference system uw and lays along the same line as the measured acceleration $\vec{a}$.

FIG. 4c refers to an instant in an interval of time in which the stator 8 rotates about rotation axis H, and is additionally affected by a linear acceleration $\vec{d}$ caused by a translation of the axle 2 along a direction parallel to axis x of the inertial reference system xyz. In this case, the measured acceleration $\vec{a}$ is equal to the vector sum of the gravity acceleration $\vec{g}$ and of the linear acceleration $\vec{d}$, the latter mutually forming a right angle, because the gravity acceleration $\vec{g}$ is parallel to axis z of the inertial reference system xyz. Furthermore, the measured position is offset with respect to the measured acceleration $\vec{a}$.

Figure 5:
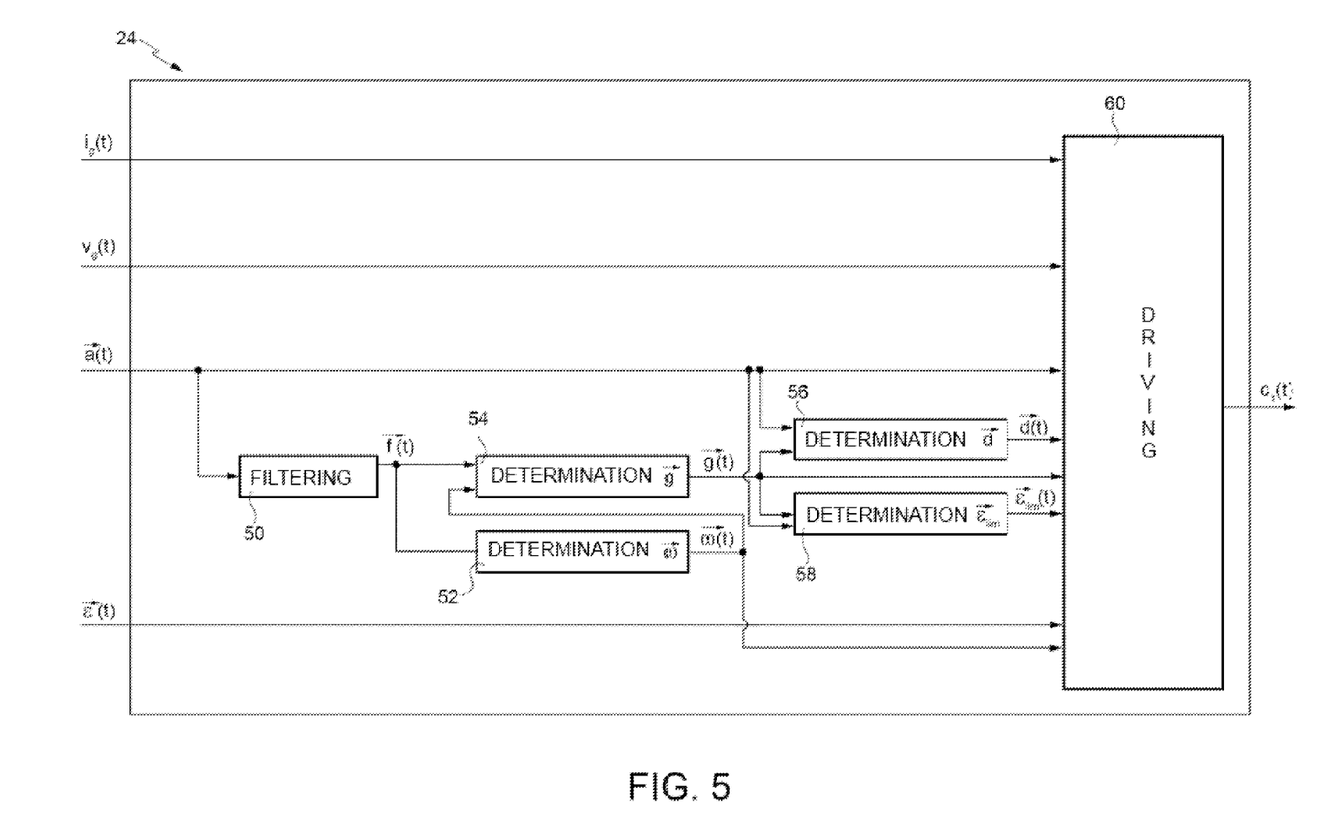
FIGS. 5 and 7 show block diagrams of portions of the system for harvesting energy shown in FIGS. 1.

As shown in FIG. 5, the control unit 24 receives the position signal $\vec{\epsilon}(t)$ and the acceleration signal $\vec{a}(t)$, and thus has the measured position and the measured acceleration $\vec{a}$. Furthermore, the control unit 24 comprises a filtering stage 50 adapted to determine a filtered acceleration $\vec{f}$, starting from the measured acceleration $\vec{a}$, by removing high frequency interference terms caused, for example, by vibrations by which the axle 2 is affected. The determination of the filtered acceleration $\vec{f}$ implies the generation of a corresponding electrical signal, e.g. of the analogue or digital type, which is referred to as filtered acceleration signal $\vec{f}(t)$.

The control unit 24 further comprises a speed determination stage 52, connected to the filtering stage 50 and adapted to generate, based on the filtered acceleration signal $\vec{f}(t)$, an angular speed signal $\vec{\omega}(t)$, indicative of the angular speed ω of the axle 2, meant as module and sense. For example, the sense of the angular speed ω of the axle 2 may be determined based on the sense of rotation of the measured acceleration $\vec{a}$ about the origin of the local reference system uw, because it coincides with the latter.

The control unit 24 further comprises a determination stage of the direction of gravity 54, connected to the filtering stage 50 and to the speed determination stage 52, and adapted to generate, based on the filtered acceleration signal $\vec{f}(t)$ and the angular speed signal $\vec{\omega}(t)$, a gravity direction signal $\vec{g}(t)$, which indicates the direction of gravity acceleration $\vec{g}$, such a direction being referred to the local reference system uw.

Figure 6:
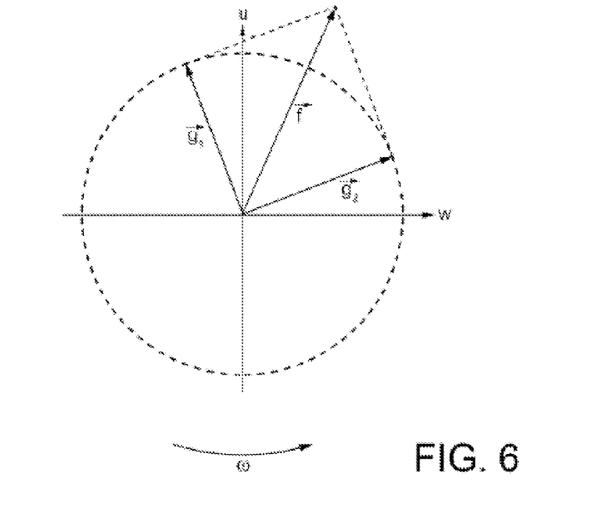

For example, as shown in FIG. 6, the direction of gravity acceleration $\vec{g}$ may be determined on the basis of the fact that the gravity acceleration $\vec{g}$ is a vector having module equal to 9.81 m/s² within the local reference system uw. Furthermore, in the assumption that the axle 2 is affected by linear accelerations directed parallel to axis x, the gravity acceleration vector $\vec{g}$ forms a right angle with the line crossing the vertex of the filtered acceleration $\vec{f}$ and tangent to the circumference having radius equal to the gravity module $\vec{g}$, the vertex of the vector of the gravity acceleration $\vec{g}$ indeed laying in the tangent point.

Thus, given the filtered acceleration $\vec{f}$, it is possible to determine the two tangency points of the two lines passing through the vertex of the filtered acceleration vector $\vec{f}$ and tangent to the circumference having radius equal to the module of the gravity acceleration $\vec{g}$. A preliminary vector (indicated by $\vec{g}_1$ and $\vec{g}_2$ in FIG. 6) is determined for each tangency point, the vertex of which lays in the tangency point itself. The gravity acceleration $\vec{g}$ is equal to one of the two preliminary vectors $\vec{g}_1$, $\vec{g}_2$; such a lack of determination may be solved, for example, by implementing a discrete time step procedure described below. In particular, reference is made to quantities $\vec{f}_i$, $\vec{g}_i$, $\vec{g}_{1i}$, $\vec{g}_{2i}$ to describe such an example procedure, which indicate the values assumed at the i-th step by the filtered acceleration $\vec{f}$, the gravity acceleration $\vec{g}$ and the preliminary vectors $\vec{g}_1$, $\vec{g}_2$, respectively; furthermore, the term 'value' means the module and the phase of the corresponding vector quantity, therefore such a term implies the reference to a vector.

In detail, the value $\vec{f}_0$ of the filtered acceleration $\vec{f}$ can be filtered at an instant $t_0$ in which the axle 2 is stationary (and thus $\vec{f}_0 = \vec{g}_{10} = \vec{g}_{20} = \vec{g}_0$), and consequently there is no lack of determination; in this manner, the corresponding value $\vec{g}_0$ of the gravity acceleration $\vec{g}$ is determined.

At a subsequent instant $t_1$, following the acceleration of the axle 2, the vector of the filtered acceleration $\vec{f}$ assumes the value $\vec{f}_1$ and rotates either i) clockwise or ii) counterclockwise with respect to the value $\vec{g}_0$. At instant $t_1$, the preliminary vectors $\vec{g}_1$, $\vec{g}_2$ assume values $\vec{g}_{11}$ and $\vec{g}_{21}$, respectively. It is thus possible to determine the value $\vec{g}_1$ of the gravity acceleration $\vec{g}$ at instant $t_i$, at which it is alternatively equal to the vector of the values $\vec{g}_{11}$ and $\vec{g}_{21}$ arranged either counterclockwise (in case i) or clockwise (in case ii), with respect to value $\vec{f}_1$.

Subsequently, at the i-th instant the lack of determination may be solved by using the value $\vec{g}_{i-1}$ relative to the previous instant ($t_{i-1}$). In particular, if the value $\vec{f}_1$ of the filtered acceleration $\vec{f}$ relative to instant $t_i$ is offset either i) in advance or ii) in delay with respect to value $\vec{g}_{1-i}$, the value $\vec{g}_i$ of the gravity acceleration $\vec{g}$ at instant $t_i$ is equal alternatively to the vector between the values $\vec{g}_{1i}$ and $\vec{g}_{2i}$ arranged either delayed (in case i), or advanced (in case ii), with respect to value $\vec{f}_i$, the advance or delay being defined as a function of the direction of rotation of the filtered acceleration $\vec{f}$.

It is worth noting that the in the particular case in which the axle 2 is rotating at constant speed, there is no lack of determination because the $\vec{f} = \vec{g}\vec{g}_1 = \vec{g}\vec{g}_2 = \vec{g}$ applies. Furthermore, it is worth noting that possible embodiments are possible in which the determination of the gravity acceleration $\vec{g}$ is carried out in different manner, e.g. in a non recursive manner, thus in a manner independent from the values assumed in previous instants of time, or by determining quantities relative to the inertial reference system xyz.

The control unit 24 further comprises an interference determination stage 56, which receives at input the acceleration signal $\vec{a}(t)$ and is further connected to the output of the gravity direction determination stage 54. The interference determination stage 56 generates an interference signal $\vec{d}(t)$, indicative of possible linear accelerations by which the axle 2 is affected. For this purpose, the interference determination stage 56 calculates the vectorial difference between the filtered acceleration $\vec{f}$ and the gravity acceleration $\vec{g}$.

The control unit 24 further comprises a limit position determination stage 58, which receives at input the acceleration signal $\vec{a}(t)$ and the gravity direction signal $\vec{g}(t)$. The limit position determination stage 58 generates a limit position signal $\vec{\epsilon}_{lim}(t)$, which is indicative of a pair of (angular) limit positions $\vec{\epsilon}_{lim-1}$, $\vec{\epsilon}_{lim-2}$ (FIGS. 4a-4c) of the counterweight 12, beyond which the system for harvesting energy 1 becomes unstable. In particular, the limit positions $\vec{\epsilon}_{lim-1}$, $\vec{\epsilon}_{lim-2}$ are referred to the local reference system uw and delimit an angular instability region R-I such that, if the counterweight 12 is therein, the system for harvesting energy 1 is unstable and thus the rotor 10 is not stable with respect to the stator 8, and so the counterweight 12 tends to rotate synchronously with the stator 8 in absence of corrections.

In detail, the angular region of instability R-I is formed by the union of a first and a second angular regions, shown by a dashed and dotted line in FIG. 4a-4c, respectively. In turn, the first angular region is 180° wide and is delimited by a line crossing the origin of the local reference system uw and orthogonal to the gravity acceleration $\vec{g}$, the first angular region not containing the gravity acceleration $\vec{g}$. Similarly, the second angular region is 180° wide and delimited by a line crossing the origin of the local reference system uw and orthogonal to the measured acceleration $\vec{a}$, the second angular region not containing the measured acceleration $\vec{a}$.

The control unit 24 further comprises a driving unit 60, which receives at input the acceleration signal $\vec{a}(t)$, the interference signal $\vec{d}(t)$, the gravity direction signal $\vec{g}(t)$, the limit position signal $\vec{\epsilon}_{lim}(t)$, the position signal $\vec{\epsilon}(t)$ and the angular speed signal $\vec{\omega}(t)$. Furthermore, the driving unit 60 receives at input the current signal $i_g(t)$ and the voltage signal $v_g(t)$.

As previously mentioned, the driving unit 60 generates the first control signal $c_1(t)$, which is applied on the control terminal $N_{c1}$ of the first power transfer stage 22. By way of example, the first control signal $c_1(t)$ may be of the pulse-width-modulated type, thus may have fixed frequency and variable duty cycle. In this case, given a period of the first control signal $c_1(t)$, the ratio between the durations of the two corresponding sub-intervals of time in which the first power transfer stage 22 operates in the "on", or "off" state, respectively, is equal to the duty cycle of the first control signal $c_1(t)$. Thus, a variation of the duty cycle of the first control signal $c_1(t)$ implies a variation of the extent of the power transfer from the stator electrical circuit 16 to the battery 20.

Figure 7:
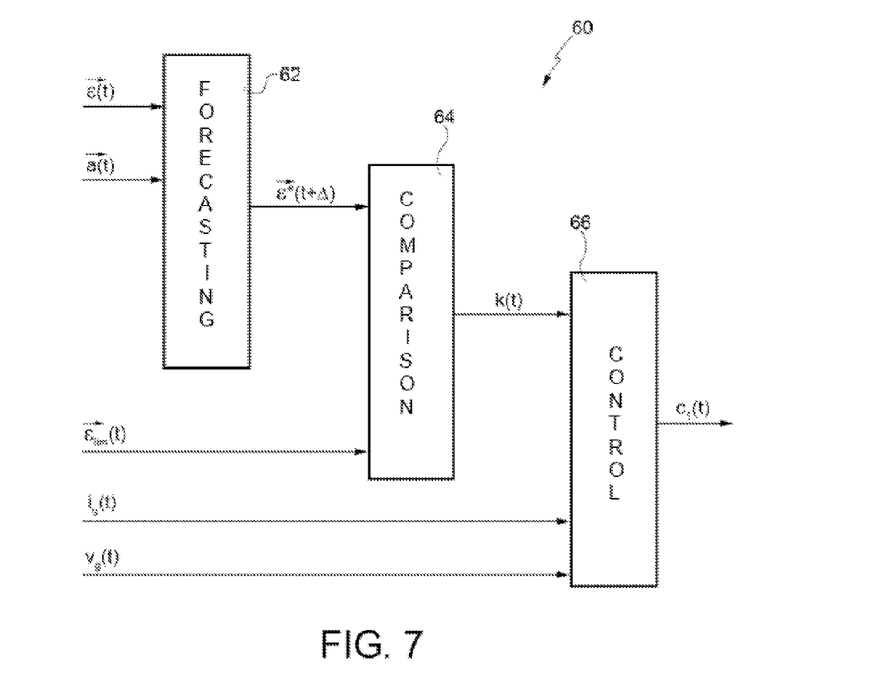

As shown in FIG. 7, the driving unit 60 comprises a forecasting stage 62, which receives at input the acceleration signal $\vec{a}(t)$ and the position signal $\vec{\epsilon}(t)$, based upon which it generates a forecasting signal $\vec{\epsilon}^*(t+\Delta)$. In particular, given a generic instant t, to which the values of the acceleration signal $\vec{a}(t)$ and of the position signal $\vec{\epsilon}(t)$ refer, the forecasting signal $\vec{\epsilon}^*(t+\Delta)$ indicates an estimate $\vec{\epsilon}^*$ of the position assumed by the counterweight 12 at instant $t+\Delta$, with $\Delta$ equal to any positive real number. Reference is made to estimate $\vec{\epsilon}^*$ as forecasted position.

The driving unit 60 further comprises a comparison stage 64, which receives at input the forecasting signal $\vec{\epsilon}^*(t+\Delta)$ and the limit positions signal $\vec{\epsilon}_{lim}(t)$, compares the forecasting signal $\vec{\epsilon}^*(t+\Delta)$ and the limit position signal $\vec{\epsilon}_{lim}(t)$ and generates an instability signal k(t), which is indicative of the relationship between the forecasted position $\vec{\epsilon}^*$ and the pair of limit positions $\vec{\epsilon}_{lim-1}$, $\vec{\epsilon}_{lim-2}$. The instability signal k(t) thus indicates, for example, a possible entrance of the forecasted position $\vec{\epsilon}^*$ in the angular instability region R-I.

The driving unit 60 further comprises a control stage 66, which receives at input the current signal $i_g(t)$, the voltage signal $v_g(t)$ and the instability signal k(t). Furthermore, in addition to the moment of inertia of the rotor 10 and the features of the dynamo 6, the control stage 66 knows the moment of inertia of the counterweight 12 with respect to the rotation axis H, the latter depending on the weight, the shape and the arrangement of the counterweight 12 with respect to rotation axis H.

The control stage 66 generates the first control signal $c_1(t)$, so as to maximize the electrical power transfer from the stator electrical circuit 16 to the battery 20, preventing the onset of instability conditions at the same time. In other words, the first control signal $c_1(t)$ is such to maximize the transfer of electrical power between the stator electrical circuit 16 and the battery 20, given the constraint of preventing the onset of instability conditions.

By way of example only, assuming for instance that the expected position $\vec{\epsilon}\,*$ is at a safety distance (e.g. equal to 10°) from the instability region R-I, the first control signal $c_1(t)$ is generated in a manner equivalent to MPPT circuits of known type, i.e. so as to maximize the product of the current $I_g$ and the voltage $V_g$ present on the output of the stator electrical circuit 16. For this purpose, by way of example, the control stage 66 may vary the duty cycle of the first control signal $c_1(t)$ over time and detect the corresponding trend of the electrical power available at output of the stator electrical circuit 16 (equal to the product of the current $I_g$ and the voltage $V_g$), so as to identify the duty cycle value which corresponds to the maximum of such electrical power. Alternatively, and again by way of example only, the control stage 66 may determine a reference current $I_{ref}$, equal to the ratio of the voltage $V_g$ and twice the output resistance (known) of the stator electrical circuit 16, such a reference current $I_{ref}$ being obtainable in the case of perfect adaptation of the load. Furthermore, the control stage 66 may compare the current $I_g$ with the reference current $I_{ref}$, generating an error signal which is provided at input to a control stage of the so-called proportional and integrative type, which in turn generates a first control signal $c_1(t)$. In this manner, the control stage 66 implements a close loop control of the duty cycle of the first control signal $c_1(t)$, and thus of the power transfer, such a control being set so as to maximize the power transfer.

Again by way of example only, assuming instead that the expected position $\vec{\epsilon}\,*$ is distanced from the angular instability angle R-I by a distance shorter than the safety distance, the first control signal $c_1(t)$ is such to set the current $I_g$ and the voltage $V_g$ so as to limit the transferred power with respect to the corresponding maximum obtainable absolute value, so as to prevent instability. In other words, given a first limit duty cycle DC1, e.g. determined in one of the manners described above and to which the absolute maximum of the electrical power transfer corresponds, and a second limit duty cycle DC2, determined in an intrinsically known manner on the basis of electromechanical equations which govern the motion of the counterweight 12, and to which the approaching of the expected position $\vec{\epsilon}\,*$ to the angular position of instability R-I within a distance shorter than the safety distance corresponds, the first control signal $c_1(t)$ has a duty cycle either equal to DC1 (if DC2>DC1) or equal to DC2 (if DC2<DC1), assuming that the buck-boost converter transfers power in manner proportional to the duty cycle of the first control signal $c_1(t)$. Again in other words, the first control signal $c_1(t)$ is such to guarantee the maximum relative transferred power, constrained to maintaining the stability conditions.

Other embodiments of different type are possible, e.g. in which the safety distance is zero. Similarly, other embodiments are possible in which there is no forecasting stage 62 and the comparison stage 64 receives at input the position signal $\vec{\epsilon}(t)$ in addition to the limit positions $\vec{\epsilon}(t)$. In such a case, the instability signal k(t) indicates the relationship between the measured position and the pair of limit positions $\vec{\epsilon}_{lim-1}$, $\vec{\epsilon}_{lim-2}$.

In practice, regardless of the implementation details, the control unit 24 processes the acceleration signal $\vec{a}(t)$ and the position signal $\vec{\epsilon}(t)$, in order to determine the angular instability region R-I instant by instant and the instantaneous position of the counterweight 12 with respect to the angular instability region R-I. In such a manner, the control unit 24 may implement one or more control algorithms of the angular position of the counterweight 12, even without knowing the angular position of the stator 8 with respect to the inertial reference system xyz, because the stator 8 is driven in rotation by the axle 2.

Figure 8:
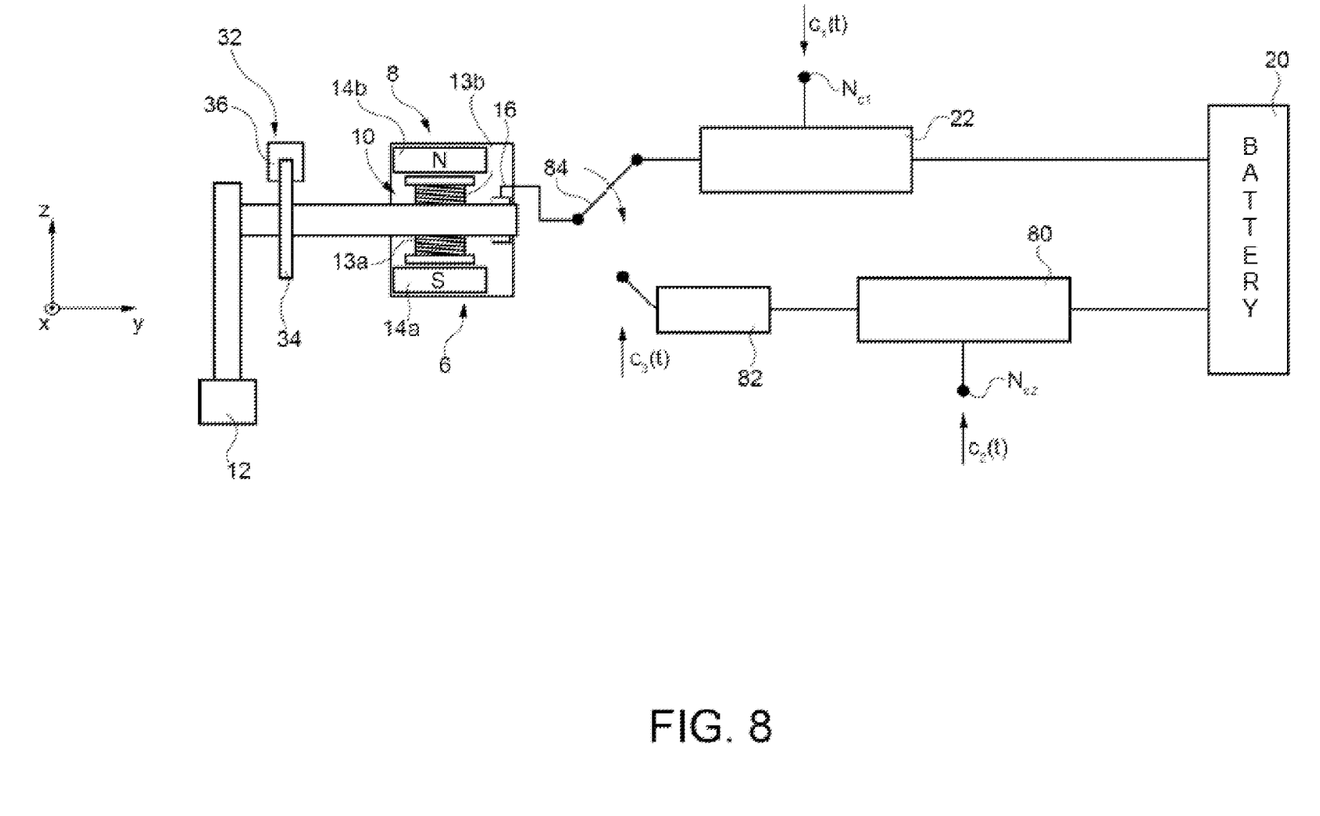
FIGS. 8 and 9 show block diagram of portions of further embodiments of the present system for harvesting energy.

According to a different embodiment, shown in FIG. 8, the system for harvesting energy 1 further comprises a power transfer stage 80, a motor control stage 82 and a switch 84.

In particular, the motor control stage 82 is interposed between the second power transfer stage 80 and the switch 84, to which it is connected. Furthermore, the switch 84 is connected to the first power transfer stage 22 and to the stator electrical circuit 16. More in particular, the switch 84 is adapted to connect the electrical stator circuit 16, alternatively to the first power transfer stage 22, or to the motor control stage 82.

By way of example only, the second power transfer stage 80 has a control terminal $N_{c2}$ and is formed by a switching converter of the known type, such as for example a converter of the so-called buck-boost converter of the non-inverting type, the switching of which between the "on" and the "off" state is controlled by applying a second control signal $c_2(t)$ to the control terminal $N_{c2}$, which is generated by the control unit 24.

More in particular, according to such an embodiment, the driving unit 60 generates the second control signal $c_2(t)$, as well as a third control signal $c_3(t)$, which controls the switch 84, in addition to the first control signal $c_1(t)$. The second and the third control signal $c_2(t)$, $c_3(t)$ are generated based on the acceleration signal $\vec{a}(t)$, the position signal $\vec{\epsilon}(t)$, the limit position signal $\vec{\epsilon}_{lim}(t)$, the current signal $i_g(t)$ and the voltage signal $v_g(t)$.

In practice, when the driving unit 60 generates the third control signal $c_3(t)$ to make the switch 84 connect the stator electrical circuit 16 at the first power transfer stage 22, such an embodiment operates in the same manner as the embodiment shown in FIG. 1. Instead, when the third control signal $c_3(t)$ is such that the switch 84 connects the stator electrical circuit 16 to the motor control stage 82, an electrical power transfer from the battery 20 to the stator electrical circuit 16 occurs, so that the dynamo operates as electrical motor, the extent of such a transfer being controlled (modulated) by the second control signal $c_2(t)$, e.g. in a manner similar to that described with regards to the first power transfer stage 22 and the first control signal $c_1(t)$. Furthermore, in an intrinsically known manner, the motor control stage 82 controls the stator 8 of the dynamo 6 so as to guarantee the correct operation of the dynamo 6 as electrical motor. For example, the motor control stage 82 may be formed by a so-called power driving circuit, such as to apply a driving voltage with appropriate polarity to the stator electrical circuit 16.

The driving unit 60 can thus modulate the electrical power transfer of the battery 20 to the stator electrical circuit 16 by varying the duty cycle of the second control signal $c_2(t)$. Thus, if the counterweight 12 enters the angular instability angle R-I, the driving unit 60 can return the system for harvesting energy 1 to stability conditions by transferring power from the battery 20 to the dynamo 6.

Figure 9:
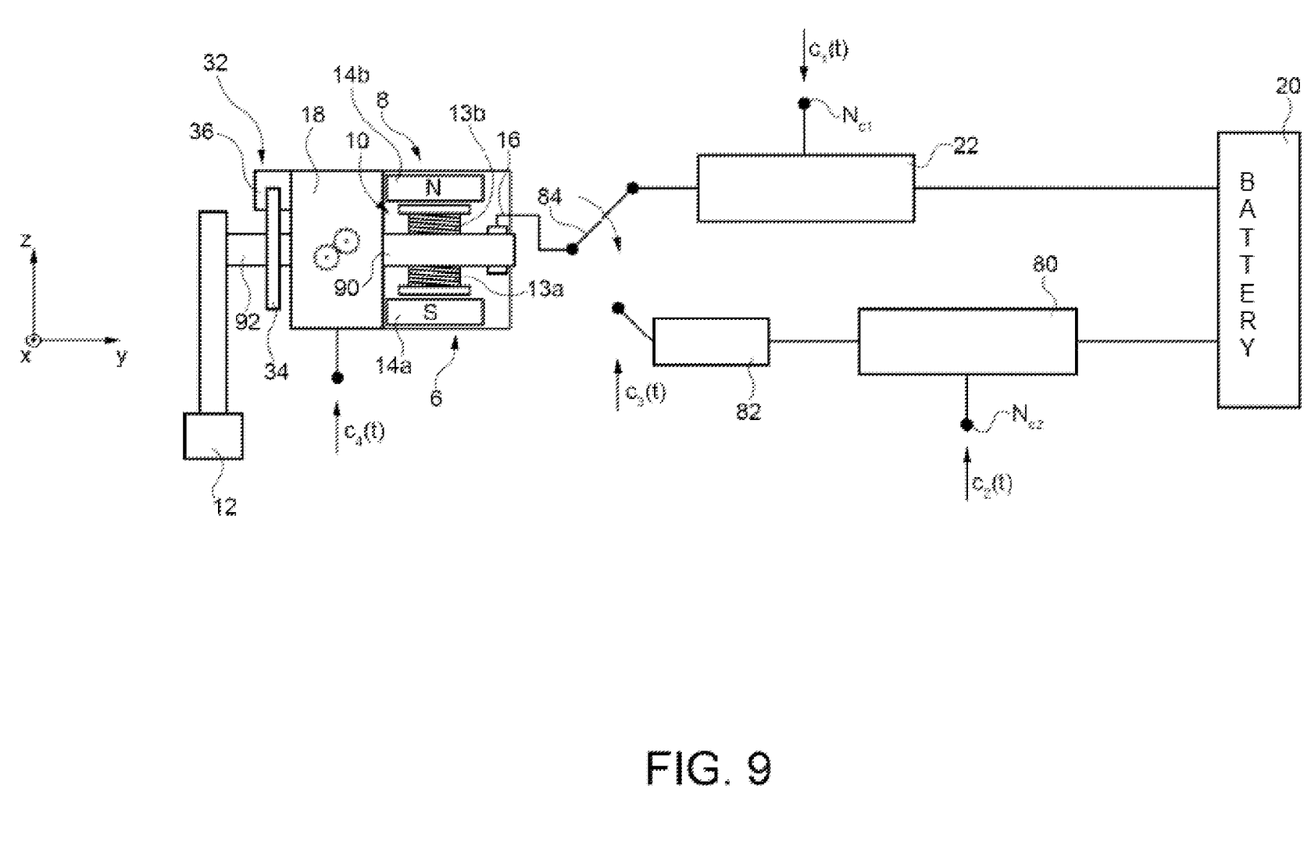

Furthermore, possible embodiments of the type shown in FIG. 9 are possible, in which the system for harvesting energy 1 comprises a transmission device 18, which is interposed in an intrinsically known manner between a rotor shaft 90, fixed to the first and the second windings 13a, 13b of the rotor 10, and an outer shaft 92. In greater detail, the counterweight 12 is fixed to the outer shaft 92; furthermore, the transmission device 18 rotably couples the rotor shaft 90 and the outer shaft 92, and has an electronically controllable gear ratio.

According to such embodiment, the driving unit 60 generates a fourth control signal $c_4(t)$, in addition to the first, second and third control signals $c_1(t)$, $c_2(t)$ and $c_3(t)$.

The fourth control signal $c_4(t)$ controls the gear ratio of the transmission device 18 and, when the switch 84 connects the stator electrical circuit 16 to the first power transfer stage 22, is a further degree of freedom to control the extent of the electrical power transfer to the load, in addition to the first control signal $c_1(t)$. Indeed, the power available at the stator 8 is proportional to the square of the angular speed with which the rotor shaft 90 rotates with respect to the stator 8. Thus, the electrical power available at the output of the stator electrical circuit 16 increases by varying, for example, the transmission ratio so as to increase the angular speed of the rotor shaft 90 with respect to the outer shaft 92. However, this implies a braking action which contributes to taking the counterweight 12 towards the angular instability region R-I.

Similarly, when the switch 84 connects the stator electrical circuit 16 to the motor control stage 82, the fourth control signal $c_4(t)$ is a further degree of freedom for controlling the extent of the electrical power transfer from the load, in addition to the second control signal $c_2(t)$.

This the, the first and the fourth control signals $c_1(t)$, $c_4(t)$ are generated so as to maximize the speed of the rotor shaft 90 and prevent the counterweight 12 from entering the instability angular region R-I, while the second and fourth control signals $c_2(t)$, $c_4(t)$ are generated, when needed, so as to restore the stability conditions.

In practice, the embodiment shown in FIG. 9 has several degrees of freedom, which can be operated to modulate the power transfer to the load and/or restore the stability conditions.

Embodiments are possible in which the power transfer is modulated from/to the load only by varying the transmission ratio; in this case, the first and the second control signals $c_1(t)$, $c_2(t)$ are not generated and the first and second power transfer stages 22, 80 are modified as a consequence. For example, each of the first and second power transfer stages 22, 80 is a MPPT circuit of known type, thus configured to extract the maximum power available at the respective input.

Embodiments of the type shown in FIG. 1 are possible, comprising the transmission device 18; in such a case, the degrees of freedom for modulating the transfer of power to the load are given by the first and fourth control signals $c_1(t)$, $c_4(t)$. Furthermore, also in this case, the electrical power transfer may be modulated only by varying the transmission ratio, in which case the first control signal $c_1(t)$ is not generated and the first power transfer stage 22 is modified as a consequence. In such a case, the first power transfer stage 22 is, for example, a MPPT circuit of known type, adapted to extract the maximum power available at the output of the stator electrical circuit 16.

The advantages that the present system for harvesting energy allows to obtain are clearly apparent from the discussion above.

In particular, the accelerometer, the optical encoder, the first and the second (if present) power transfer stage, the control unit and (if present) the transmission device form a system for controlling the angular position of the counterweight. Thus, the present device for harvesting energy essentially allows to monitor the angular position of the counterweight in real time and to modulate the electrical load transfer from the dynamo to the load as a function of the angular position of the counterweight. In such a manner, it is possible to maximize the electrical power transfer to the load without risking to drive the system for harvesting energy in conditions of instability. Furthermore, the present energy collection system allows to restore the optimal operating conditions once the stability conditions are established.

It is finally apparent that changes and variations can be made to the present system for harvesting energy without departing from the scope of protection of the present invention as defined in the appended claims.

For example, a different encoder may be used instead of optical encoder 32, e.g. a magnetic or capacitive encoder.

Again by way of example, although the described examples refer to a dynamo, an alternator may be used instead of the dynamo, e.g. a brushless alternator; in general, any rotating induction electrical machine may be used. In particular, in case of a brushless alternator, the motor control stage 82 is changed as a consequence; in such a case, indeed, the motor control stage 82 is adapted to generate three voltages offset by 120° and synchronous with respect to the position of the rotor 10, so as to control the three windings in the stator electrical circuit in appropriate manner.

Furthermore, the rotor may be constrained to the container, and thus fixed to the axle; in this case, the stator of the dynamo is moveable with respect to the axle and the counterweight is fixed to the stator instead of the rotor.

Furthermore, the first and the second power transfer stages 22, 80 may be different from that described. Similarly, the first and second power transfer stages 22, 80 may be controlled by using signals different from the pulse-width-modulated signals.

With regards to the control unit 24, the filtering stage 50 may be absent, in which case processing is carried out starting from the measured acceleration $\vec{a}$, instead of the filtered acceleration $\vec{f}$. Furthermore, in an intrinsically known manner, the control unit 24 may calculate further quantities with respect to those described, or may determine the quantities mentioned above (e.g. gravity acceleration $\vec{g}$) differently from that described.

Additionally, the control unit 24 may implement a counterweight control algorithm which is different from that described. It is worth nothing that if the system for harvesting energy is constrained to a rotating element instead of a rotating and translating element, the gravity direction determination stage 54 may be missing, because gravity acceleration $\vec{g}$ lays along the same line as the measured acceleration a.

Other embodiments are possible in which the counterweight 12 is mechanically coupled to the rotor 10 in a releasable manner, in which case in presence of instability conditions, the control unit generates an electrical control signal which causes the uncoupling of the counterweight 12 from the rotor 10, in order to restore the stability conditions.

Finally, the system for harvesting energy 1 may be equipped with further devices, such as, for example, a temperature sensor or a wireless communication unit, which are further connected to the electrical circuit of the stator 16. Furthermore, a gyroscope or a set of two or more accelerometers may be present either in addition to or instead of the accelerometer 30.

The invention claimed is:

1. A system for harvesting energy comprising:
   an electrical machine including a first structure and a second structure, movable with respect to each other, the first structure being a stator and the second structure being a rotor, the first structure being configured to be constrained to a rotating or rotating and translating element, so as to be driven in rotation by the rotating or rotating and translating element;
   a counterweight coupled to the second structure so that the second structure is subject to a first gravitational torque;
   a power transfer structure, electrically connected to the first structure, configured to be connected to a load and adapted to transfer electrical power from the first structure to the load, in an electrically controllable manner, the electrical power transfer causing the application of a second torque on the second structure, the module of which is a function of the electrical power transferred, the second torque being balanced, when the counterweight is in an angular stability region, by the first gravitational torque so as to cause the generation of an electrical voltage in the first structure;
   an angular position sensor constrained to the second structure and configured to provide a position signal ($\vec{\epsilon}(t)$) indicating the angular position of the counterweight, the angular position being referred to a local reference system fixed to the second structure; and
   an accelerometer constrained with respect to the first structure and configured to provide an acceleration signal ($\vec{a}(t)$) indicating an acceleration which affects the first structure, the acceleration being referred to the local reference system;
   a control unit, having;
      a first stage configured to generate, based on the acceleration signal, a limit position signal ($\vec{\epsilon}_{lim}(t)$) indicating an angular instability region, the angular instability region being referred to the local reference system and being such that, when the counterweight is within the angular instability region, the counterweight tends to rotate synchronously with the first structure; and
      a second stage configured to control the power transfer structure based on the position signal and on the limit position signal, so as to modulate the transfer of electrical power to the load so as to prevent the counterweight from entering into the angular instability region.

2. The system according to claim 1, wherein the second stage is configured to control the power transfer structure so as to maximize the electrical power transfer to the load.

3. The system according to claim 2, wherein the power transfer structure further comprises a first power transfer circuit stage configured to be electrically connected to the first structure and to the load and adapted to transfer electrical power from the first structure to the load, in an electrically controllable manner by means of a first control signal; and wherein the second stage is configured to generate the first control signal, based on the position signal ($\vec{\epsilon}(t)$) and on the limit position signal ($\vec{\epsilon}_{lim}(t)$).

4. The system according to claim 3, wherein the control unit further comprises a third stage configured to generate a gravity direction signal ($\vec{\epsilon}(t)$) indicating the gravity acceleration direction, based on the acceleration signal ($\vec{a}(t)$), the direction being referred to the local reference system (u, w); and wherein the first stage is configured to generate the limit position signal ($\vec{\epsilon}_{lim}(t)$) based also on the gravity direction signal.

5. The system according to claim 4, wherein the control unit further comprises:
   a fourth stage configured to generate an expected position signal ($\vec{\epsilon}^*(t)$) indicating an expected angular position of the counterweight, based on the acceleration ($\vec{a}(t)$) and position ($\vec{\epsilon}(t)$) signals; and
   a fifth stage configured to generate a comparison signal (k(t)) indicating a comparison between the angular instability region and the expected angular position of the counterweight; and wherein
   the second stage is configured to generate the first control signal based also on the comparison signal.

6. The system according to claim 5, wherein the first power transfer stage further comprises a switching converter configured to alternately operate in a first and a second state, the switching between the first and second states being controlled by the first control signal.

7. The system according to claim 6, further comprising a second power transfer stage configured to be electrically connected to the first structure and to the load and electrically controllable so as to transfer electrical power from the load to the first structure, so as to return the counterweight to the angular stability region, once the counterweight has entered into the angular instability region.

8. The system according to claim 7, wherein the counterweight is fixed to the second structure.

9. The system according to claim 7, further comprising an outer shaft, the counterweight being fixed to the outer shaft, and wherein the power transfer structure provides a transmission device disposed between the outer shaft and the second structure and having an electrically controllable gear ratio, the second stage being configured to vary the gear ratio, based on the position signal ($\vec{\epsilon}(t)$) and on the limit position signal ($\vec{\epsilon}_{lim}(t)$), so as to modulate the electrical power transfer to the load so as to prevent the counterweight from entering into the angular instability region.

10. An electromechanical system comprising:
    an electrical machine including;
       a first structure and a second structure, movable with respect to each other, the first structure being a stator and the second structure being a rotor, the first structure being configured to be constrained to a rotating or rotating and translating element, so as to be driven in rotation by the rotating or rotating and translating element;
       a counterweight coupled to the second structure so that the second structure is subject to a first gravitational torque;
       a power transfer structure, electrically connected to the first structure, configured to be connected to a load and adapted to transfer electrical power from the first structure to the load, in an electrically controllable manner, the electrical power transfer causing the application of a second torque on the second structure, the module of which is a function of the electrical power transferred, the second torque being balanced, when the counterweight is in an angular stability region, by the first gravitational torque so as to cause the generation of an electrical voltage in the first structure;

an angular position sensor constrained to the second structure and configured to provide a position signal ($\vec{\epsilon}(t)$) indicating the angular position of the counterweight, the angular position being referred to a local reference system fixed to the second structure;

an accelerometer constrained with respect to the first structure and configured to provide an acceleration signal ($\vec{a}(t)$) indicating an acceleration which affects the first structure, the acceleration being referred to the local reference system;

a control unit, having;

a first stage configured to generate, based on the acceleration signal, a limit position signal ($\vec{\epsilon}_{lim}(t)$) indicating an angular instability region, the angular instability region being referred to the local reference system and being such that, when the counterweight is within the angular instability region, the counterweight tends to rotate synchronously with the first structure; and a second stage configured to control the power transfer structure based on the position signal and on the limit position signal, so as to modulate the transfer of electrical power to the load so as to prevent the counterweight from entering into the angular instability region.

* * * * *